United States Patent Office 3,431,711
Patented Mar. 11, 1969

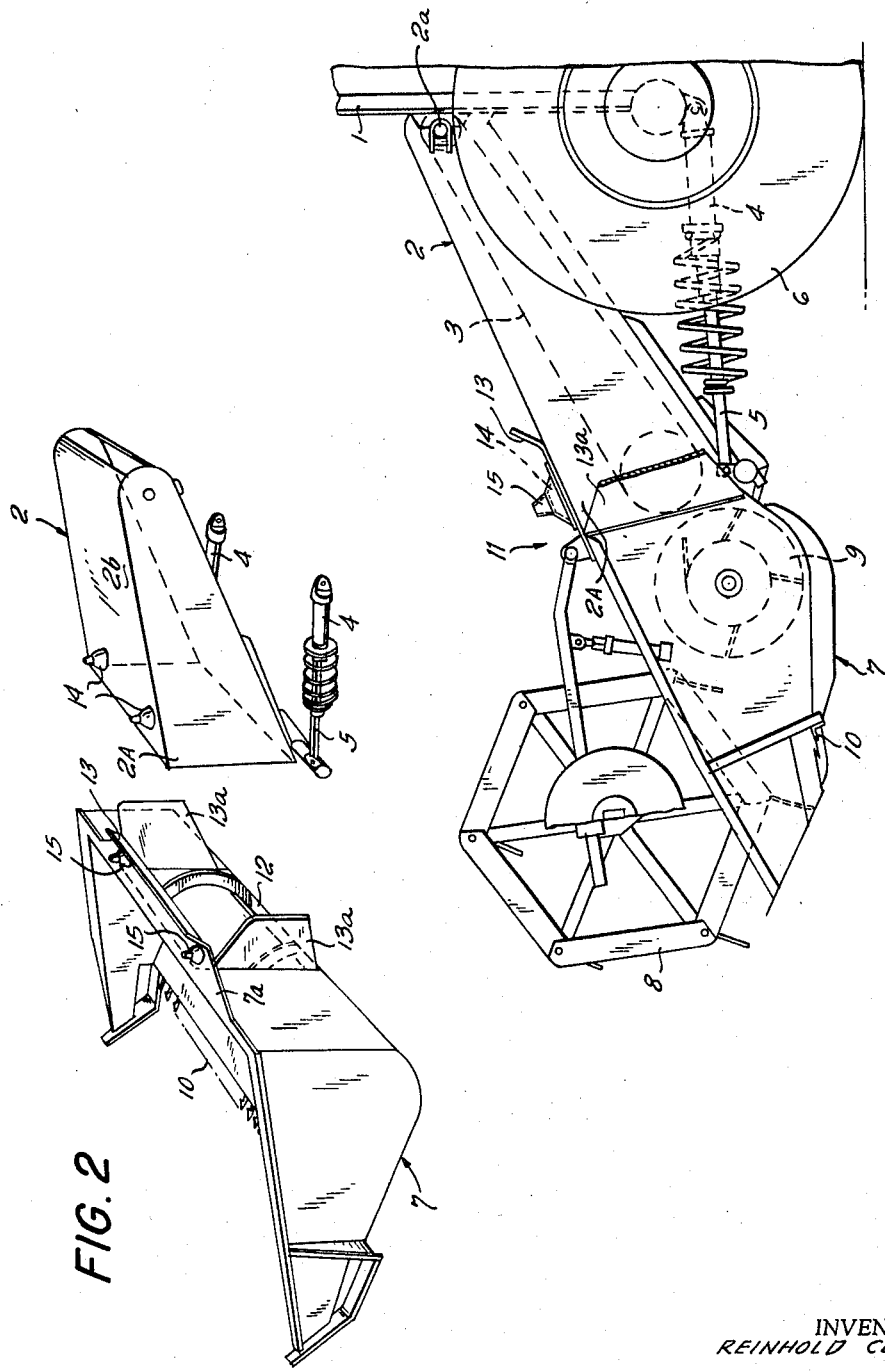

3,431,711
ALIGNING DEVICE FOR ATTACHMENTS OF
AGRICULTURAL MACHINES AND THE LIKE
Reinhold Claas, August-Claas-Strasse 64,
Harsewinkel, Germany
Filed Feb. 23, 1966, Ser. No. 529,383
Claims priority, application Netherlands, Feb. 22, 1965,
6502216
U.S. Cl. 56—21                                14 Claims
Int. Cl. A01d 41/10, 41/12

ABSTRACT OF THE DISCLOSURE

An agricultural machine having a mobile unit and a second unit to be coupled with the mobile unit, in which the units are provided with cooperating aligning means for aligning the units with each other prior to actual coupling upon movement of the mobile unit towards the second unit and with cooperating coupling means for automatically coupling the units to each other in response to alignment thereof.

---

The present invention relates to an aligning device which may be utilized to place an attachment and/or one or more components of an attachment into registry with complementary components of a tractor or an analogous mobile unit forming part of an agricultural machine or another conveyance. For example, the improved aligning device may be utilized on harvester combines to facilitate proper alignment of a mowing or other attachment with the prime mover of the combine preparatory to actual coupling.

It is already known to provide a readily separable connection between the powered unit and the mowing attachment of a harvester combine. Such connections are often required by authorities, particularly if the attachment extends transversely of and well beyond the one and/or the other side of the prime mover. The reason for such requirement is that, in transporting the attachment to or from the locale of use, the combine should not interfere with traffic by occupying more than a single lane of the road. As a rule, the attachment is coupled to the front end of a vertically adjustable conveyor housing located in front of the driver's seat. Reference may be had, for example, to my U.S. Patent No. 3,109,433 which shows a harvester combine with an attachment located in front of the wheel-mounted mobile unit.

Normally, the connection between the mobile unit and the attachment is constituted by bolts and nuts, wedges, simple bolts and like readily separable fasteners. For transportation to or from the field, the attachment is separated from the mobile unit and is mounted lengthwise on a suitable trailer which is hitched to the rear end of the prime mover so that, in transport, the attachment does not extend beyond the lateral sides of the remainder of the combine. Of course, such separation of the attachment also necessitates separation of pneumatic and/or hydraulic conduits, motion transmitting shafts and other auxiliary components which are provided in part on the prime mover and in part on the attachment.

Uncoupling of the attachment and of other components invariably involves much time and not infrequently considerably physical effort. It is not uncommon that the separating operation must be performed by at least two persons. However, such separation or uncoupling of the attachment is actually a minor problem because more serious difficulties arise when it becomes necessary to reassemble the attachment with the mobile unit preparatory to the actual harvesting operation. In order to properly assemble the attachment with the mobile unit, the driver must manipulate the mobile unit with utmost precision so that the complementary component parts of the coupling or couplings are sufficiently close to each other for actual engagement. Such accurate maneuvering of the mobile unit is often impossible due to specific configuration or composition of terrain, for example, when the trailer with the attachment comes to a halt on relatively hard ground while the mobile unit must be maneuvered in mud, in deep snow, in sand or the like. As a rule, the reassembly of an attachment with the mobile unit requires two or more persons so that the driver must have company despite the fact that the actual harvesting operation can be carried out under the supervision of a single person.

Accordingly, it is an important object of the present invention to provide a harvester combine or an analogous conveyance wherein a mobile unit must be repeatedly coupled with and disconnected from an attachment and to construct the conveyance in such a way that the mobile unit may be readily, rapidly and conveniently moved into requisite alignment with the attachment preparatory to actual coupling.

Another object of the invention is to provide a conveyance wherein proper alignment of the mobile unit with the attachment automatically results in coupling of the two units so that the operator in charge of the mobile unit need not even leave the driver's seat in order to insure that the two units are properly connected with each other.

A further object of the invention is to provide a conveyance of the above outlined characteristics with an improved aligning device which enables a single operator to properly align and couple the mobile unit with a relatively large, heavy and unwieldly attachment without necessitating the exertion of any force other than that necessary to maneuver the mobile unit.

Still another object of the instant invention is to provide a conveyance wherein not only the attachment but also one or more components of such attachment may be automatically aligned with and coupled to complementary components of the mobile unit in response to proper alignment of the mobile unit with the attachment.

A concomitant object of the invention is to provide an aligning device which not only serves to place two relatively movable units of a conveyance into accurate registry with each other but actually couples such units.

Briefly stated, one feature of my present invention resides in the provision of a harvester combine or another suitable conveyance which comprises a mobile unit (for example, a tractor or the engine-driven wheel-mounted part of a combine) a second unit which may be constituted by a cutting or mowing attachment for a harvester combine, and a novel aligning device which serves to place the two units into registry preparatory to actual coupling. In accordance with the broadest aspects of my invention, the aligning device comprises a socket provided on one of the units and a male member provided on the other unit. The socket has an inlet and tapers in a direction inwardly from such inlet. The male member is receivable with clearance in the inlet and is movable deeper into the socket to thereby place the two units into accurate registry in response to such manipulation or maneuvering of the mobile unit that the male member is introduced through the inlet and deeper into the socket.

In accordance with a more specific feature of my invention, the mobile unit may be provided with a front housing and the second unit also comprises a housing which is to be aligned with and coupled to the front housing. The components of the aligning device may be configurated in such a way that they automatically couple the two housings when the male member is introduced through the inlet and into the interior of the socket. For example, the socket may resemble a hollow cone and may be provided on the housing of the second unit in such a way that its inlet is located at the lower end thereof. The male member may also resemble a cone which can be introduced into the hollow cone in response to such manipulation of the housing on the mobile unit that the male member moves upwardly.

Alternatively, the socket may resemble a funnel or hopper which is provided on the second unit and the male member may be constituted by a portion of the front housing. Such construction is particularly desirable in a harvester combine wherein the gathering reel of the attachment serves to feed material to an elevator or an analogous conveyor which is provided in the interior of the front housing on the mobile unit. In such conveyances, the socket simultaneously defines a pasage or opening through which the material is forced or transferred onto the elevator to be thereupon processed by the threshing apparatus of the mobile unit.

The novel features which are considered as characteristic of the invention are set forth in particular in the appended claims. The improved aligning device itself, however, both as to its construction and its mode of operation, together with additional features and advantages thereof, will be best understood upon perusal of the following detailed description of certain specific embodiments with reference to the accompanying drawings, in which:

FIG. 1 is a fragmentary side elevational view of a harvester combine wherein the housing of an elevator is coupled with the housing of a front attachment in accordance with one embodiment of my invention;

FIG. 2 is a perspective view of the two housings in disassembled position;

Figure 3:
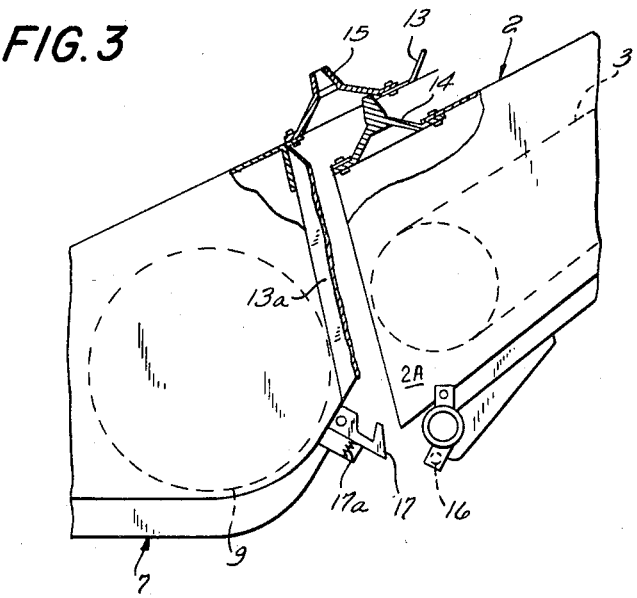
Figure 4:
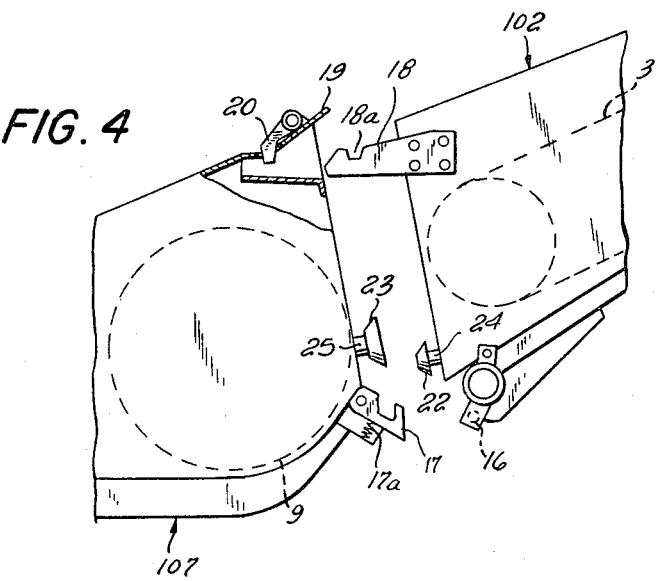

FIG. 3 is an enlarged fragmentary side elevational view of the structure shown in FIG. 2 and illustrates the mobile housing in an intermediate position on its way into registry with the housing of the attachment, portions of the two housings being shown in section; and FIG. 4 is a similar fragmentary side elevational view of the two housings wherein the aligning device is provided with differently configurated aligning elements.

Referring to the drawings in detail, and first to FIG. 1, there is shown a portion of a conveyance in the form of a harvester combine including a mobile unit, and a second unit. The mobile unit comprises a frame 1 which carries the driver's seat (not shown) and is mounted on wheels 6. This frame further supports a front housing 2 which is rockable about horizontal pivot pins 2a and may be angularly displaced by a rocking device including a hydraulic or pneumatic cylinder 4 and a piston rod 5. The interior of the housing 2 accommodates a suitable conveyor here shown as an elevator 3 which can comprise one or more belts, chains or the like and serves to convey the crop to a threshing device (not shown) located to the right of the cylinder 4. Reference may be had to my aforementioned U.S. Patent No. 3,109,433.

The second unit is constituted by an attachment which includes a housing 7 accommodating a rotary screw auger 9 or an analogous transfer member which can feed the crop onto the elevator 3, a customary cutter bar 10 which cuts the crop, and a gathering reel 8 which supplies freshly severed crop to the transfer member 9.

In accordance with my present invention, the housings 2 and 7 may be placed into registry and are then automatically coupled to each other by resorting to a novel aligning device which is best shown in FIGS. 2 and 3. The numeral 11 indicates in FIG. 1 the general plane in which the faces of the housings 2 and 7 meet when the attachment is properly coupled to the mobile unit. The ability of the housing 2 to pivot about the pins 2a and the mobility of the unit including the housing 2 play an important role in enabling a single operator to bring about a satisfactory connection without the exertion of any physical force other than that necessary to control the operation of the cylinder 4 and to maneuver the mobile unit in a manner to be described later. The controls for the cylinder 4 are preferably within reach from the driver's seat so that the forward part 2A of the housing 2 may be raised or lowered, as the need be, while the driver controls the steering wheel.

As shown in FIG. 2, the aligning device comprises a substantially funnel-shaped socket including an upwardly and rearwardly diverging upper wall 13 and two outwardly and rearwardly diverging side walls 13a. The inlet of this socket is rather large and the cross-sectional area of the socket diminishes forwardly, i.e., away from the inlet, so that the walls 13, 13a can guide a male aligning member which is constituted by the foremost part 2A of the front housing 2.

The top wall 2b of the housing 2 carries two upwardly extending strongly conical male coupling members 14 which may enter from below two hollow strongly conical female coupling members 15 provided on the top wall 7a of the housing 7 directly in front of the upper wall 13. The bottom of the socket defined by the walls 13, 13a is open, as at 12, so that material delivered by the transfer member 9 can pass through the socket and into the range of the elevator 3 in the housing 2. The coupling members 14, 15 may be made of sheet metal or the like.

In coupling the housing 7 to the housing 2, the operator proceeds as follows: The mobile unit including the housing 2 is maneuvered by the engine and steering wheel to a position in which the housing roughly assumes the position shown in FIG. 2. In other words, the foremost part 2A of the housing 2 (this foremost part constitutes the male member of the aligning device) is adjacent to but still spaced from the inlet to the socket of the housing 7. The male coupling members 14 are preferably located at a level below the upper wall 13. In the next step, the operator drives the mobile unit forwardly so that the front part 2A enters the inlet and, if slightly misaligned, slides along the one or the other side wall 13a to penetrate toward the open inner end 12 of the socket. Such forward movement of the housing 2 might eventually result in some displacement of the attachment but, with a little care and experience, the operator can readily introduce the front part 2A into the space between the walls 13, 13a so that the tips of the conical male members 14 are located at a level below the inlets to the female coupling members 15. Such position of a coupling member 15 and a coupling member 14 is shown in FIG. 3. The operator then simply operates the controls of the cylinder 4 to expel the piston rod 5 whereby the front part 2A travels upwardly and the male coupling members 14 automatically find their way into the interior of the female coupling members 15. In fact, the front part 2A may be raised to such a level that the housing 2 actually lifts the housing 7 off the trailer whereby one or more spring-biased coupling hooks 17 (see FIG. 3) of the housing 7 automatically engage complementary coupling bars 16 or the like on the housing 2 to insure that the two housings remain connected to each other until after the operator decides to pivot the hooks 17 against the bias of the spring or springs 17a. FIG. 3 shows that the male coupling member 14 can be introduced through the inlet of the female coupling member 15 even if, at the time the front part 2A begins to move upwardly, the members 14, 15 are well out of accurate registry. The two pairs of cooperating coupling members 14, 15 actually constitute two additional aligning devices which can effect true alignment of the housings 2 and 7 when the tips of the members 14 are caused to penetrate through the inlets and thereupon into the interior of the members 15.

Once the male coupling members 14 are caused to enter the corresponding female members 15 and lift the housing 7 off the trailer, the two housings 2 and 7 automatically assume the positions shown in FIG. 1 and are coupled to each other for simultaneous movement about the pivot pins 2a. The coupling members 16, 17 serve to lock the two housings to each other in automatic response to entry of male members 14 into the female members 15.

The socket including the walls 13, 13a may be provided with an additional wall (not shown) which is then located below the opening 12. It is further clear that the position of male and female aligning and/or coupling members may be reversed without departing from the spirit of my invention.

FIG. 4 illustrates a modified aligning device which serves to place the housing 107 of an attachment into registry with the housing 102 of a mobile unit. The aligning device is of the self-locking type and comprises two sockets 19 (only one shown) provided on the housing 107 and two male members 18 provided on the housing 102. The inlets of the sockets 19 can receive the male members 18 with considerable clearance. However, as the members 18 are caused to penetrate deeper into the respective sockets 19, they bring about automatic alignment of the housings 102, 107 and, when the adjoining faces of these housings come into actual contact with each other, the pallets of spring-biased male coupling members or hooks 20 snap into complementary notches 18a of the members 18. At the same time, the spring-biased hooks 17 engage the bars 16 to lock the two housings to each other. The male aligning members 18 are bolted from the outside to the respective side walls of the housing 102. The sockets 19 preferably resemble funnels and can guide the members 18 in such a way that the housings 102, 107 may be placed into accurate alignment beginning with a position of the housing 102 in which the members 18 are somewhere in front of the inlets of the sockets 19.

FIG. 4 further shows the male and female components 22, 23 of an aligning device for the two parts 24, 25 of a composite drive shaft which serves to transmit motion to certain elements of the attachment. The female component 23 again resembles a socket which receives and guides the male component 22 in response to penetration of components 18 into the corresponding sockets 19. Similar connections may be provided between portions of hydraulic or pneumatic conduits, spindles, rods, bars and/or other elements which are provided in part on the housing 102 and in part on the housing 107.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a conveyance, in combination, a mobile unit including a first member having a pair of wheels turnably about a common axis so that the first member is movable in a first direction substantially normal to said common axis, and a second member projecting from said first member and being rockable about a rocking axis substantially parallel to said common axis so that an end face of said second member is movable in a second direction transverse to said first direction; means connected to said first and said second member for rocking the latter about said rocking axis; a second unit connectable and disconnectable from said second member of said first unit; cooperating aligning means including means at each side of said first and said second unit for aligning said second member of said first unit and said second unit in said first and said second direction during movement of said first unit in said first direction towards said second unit and rocking of said second member about said rocking axis; and cooperating coupling means on said second member of said first unit and on said second unit for automatically coupling said units when said second member of said first unit is brought by said aligning means in alignment with said second unit.

2. A structure as set forth in claim 1, wherein said cooperating aligning means comprise a socket element having an inlet and tapering inwardly from said inlet and a male element receivable in said socket element, one of said elements being provided on said second member of said first unit and the other element being provided on said second unit.

3. A structure as set forth in claim 2, further comprising at least one additional socket element provided on one of said units and a male element for each additional socket element to assist said first named aligning means in placing said units into registry with each other.

4. A structure as set forth in claim 2, wherein said mobile unit comprises a front housing having a front face and said second unit is constituted by an attachment including a second housing having a rear face which, when said units register, abuts against said front face.

5. A structure as set forth in claim 4, wherein said socket element is provided on said second housing and has an inlet spaced rearwardly from said rear face, said male element being constituted by a portion of said front housing adjacent to said front face.

6. A structure as set forth in claim 5, wherein said socket element comprises a plurality of walls diverging rearwardly from said rear face.

7. A structure as set forth in claim 1, wherein said mobile unit is a prime mover of an agricultural machine and said second member of said first unit being constituted by a housing, said second unit being constituted by an attachment having a second housing.

8. A structure as set forth in claim 7, wherein said mobile unit further comprises a conveyor mounted in said first housing and said attachment further includes cutter means and transfer means for supplying material severed by said cutter means to said conveyor.

9. A structure as set forth in claim 7, wherein said socket element resembles a funnel and is carried by said second housing, said male element being constituted by a portion of said first housing.

10. A structure as set forth in claim 1, wherein said cooperating coupling means comprise cooperating male and female coupling members respectively provided on said second member of said first unit and on said second unit.

11. A structure as set forth in claim 10, wherein one of said coupling members is a spring-biased hook and the other coupling member is a bar which is engaged by said hook in response to alignment of said units.

12. A structure as set forth in claim 10, wherein at least one of said female coupling members is a spring-biased hook mounted on said second unit and the male member cooperating therewith is a bar mounted on said second member of said mobile unit.

13. A structure as set forth in claim 12, and including at least one additional female member in form of a hollow cone and an additional male member in form of a cone which is received in said hollow cone in response to alignment of said units.

14. A structure as set forth in claim 12, wherein said aligning means comprise a socket element in form of a funnel mounted on said second unit and a male element constituted by a hook shaped member projecting from said second member of said first unit, and including a hook carried by said funnel and engaging with said hook shaped member when the latter penetrates into said funnel.

References Cited

UNITED STATES PATENTS

| | | | |
|---|---|---|---|
| 2,867,958 | 1/1959 | Allen | 56—21 |
| 3,270,489 | 9/1966 | Rohweder | 56—2 XR |
| 3,324,637 | 6/1967 | Ashton et al. | 56—21 |

ANTONIO F. GUIDA, *Primary Examiner.*